Sept. 1, 1959   B. M. S. KALLING ET AL   2,902,358
METHOD OF COUNTERACTING TOO HIGH TEMPERATURE ATTACK ON THE
FURNACE LINING WHEN MELTING AND REFINING MOLTEN METAL BY
MEANS OF OXYGEN CONTAINING GASES IN A ROTARY FURNACE
Filed Jan. 27, 1958
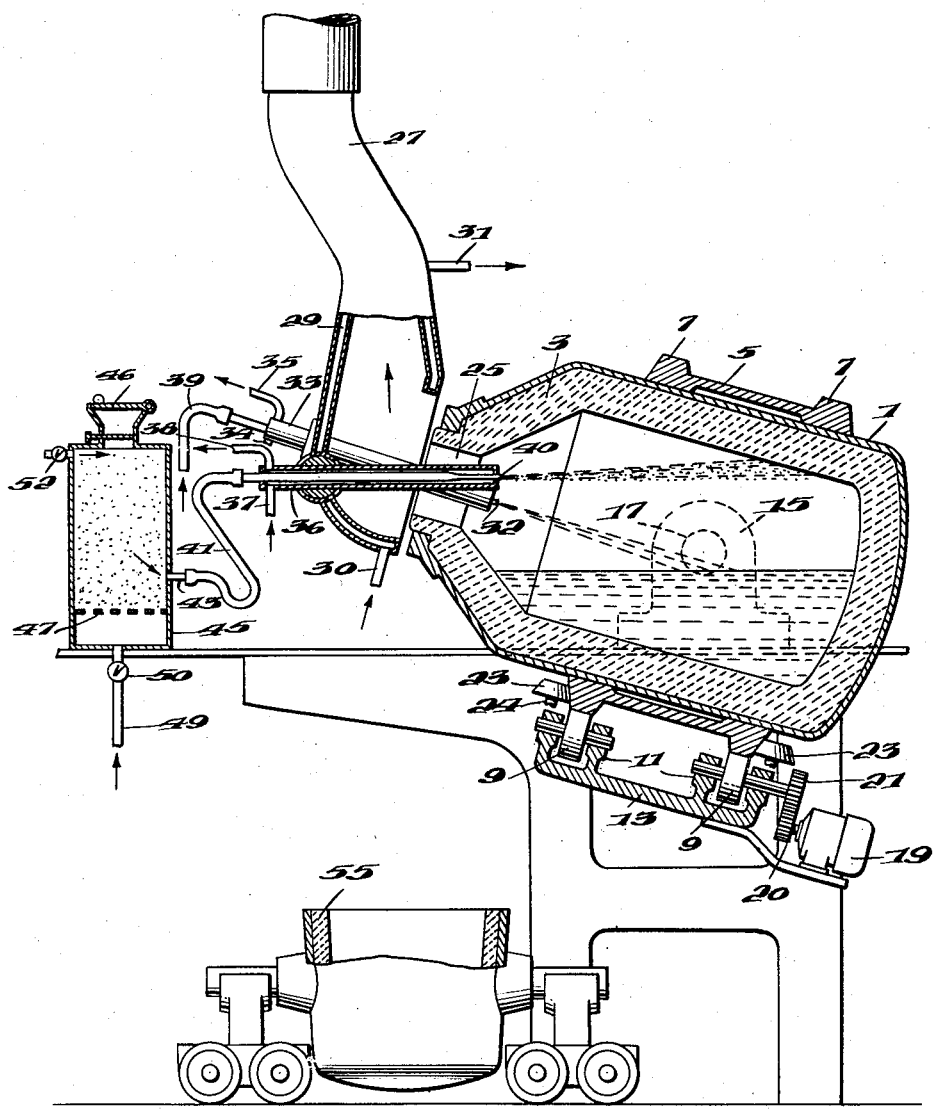
INVENTORS
Bo Michael Sture Kalling
Folke Karl Evald Johansson
BY Pierce, Scheffler & Parker
ATTORNEYS

United States Patent Office 2,902,358
Patented Sept. 1, 1959

2,902,358
METHOD OF COUNTERACTING TOO HIGH TEMPERATURE ATTACK ON THE FURNACE LINING WHEN MELTING AND REFINING MOLTEN METAL BY MEANS OF OXYGEN CONTAINING GASES IN A ROTARY FURNACE

Bo Michael Sture Kalling, Domnarvet, and Folke Karl Evald Johansson, Hallsjogarden, Borlange, Sweden, assignors to Stora Kopparbergs Bergslags Aktiebolag, Falun, Sweden, a company of Sweden Application January 27, 1958, Serial No. 711,501
Claims priority, application Sweden February 1, 1957
3 Claims. (Cl. 75—60)

In metallurgical melting and refining processes it is often difficult to attain a sufficient durability of the furnace lining. This is particularly true for such refining processes where oxygen or air enriched in oxygen is blown onto the surface of or into the melt in order to bring about a desired oxidation of certain constituents of the metal, and at the same time to generate the necessary heat for the process. Normally this heat generation is so strong that it is necessary to perform additions of one or the other material during the process in order to counteract too high temperatures. Such additions may be of the type slag forming substances, mainly lime scrap iron to be molten by the excess heat, and iron oxide (ore) which is then reduced to metallic iron under consumption of such excess heat. But even if the average temperature of the melt by such measures may be kept at such a level within the range necessary for the process to be carried out which should be low enough to keep the attack on the lining within reasonable limits there is no guaranty against local superheating, particularly in that region or zone of the furnace where the reaction with oxygen takes place primarily, and that, by radiation from said region, excess heat is transferred to the lining and causes local damages. Such local superheating of the lining are also caused by the hot gases escaping from the contact surface between the oxygen jet and the melt which gases, substantially containing oxygen and carbon monoxide, are combusted in the atmosphere above the melt thereby causing a further temperature rise.

The present invention has for its main purpose to avoid such disadvantages as above referred to.

For this purpose and other purposes which will be evident from the following specification the present invention relates to a method in carrying out melting and refining processes of metals, particularly iron and steel and alloys thereof, in a rotary furnace for preventing excess heat generated when blowing oxygen against the melt to be transferred to the furnace lining and give rise to damages. The principal feature of this present invention is to introduce into the furnace a cooling agent in such a way as substantially to cut off the ways of heat transfer from the hottest region to the lining above the melt.

The cooling medium to be used according to the invention can be gaseous, liquid or solid. The gaseous agents can be carbon dioxide, common air, nitrogen, other non-reactive gases or steam. As liquid agent only such which will be vaporized when blown into the furnace, especially water come in question. The solid agents can be taken from the group comprising slag forming agents, particularly lime or limestone, iron oxide (ore), and iron, such solid agents being comminuted to a suitable grain size. In the first range such agents within the classes specified should be chosen which are required for the process or have a favourable effect thereon.

When gaseous or liquid agents are used they should be injected separately from the oxygen jet and in such a manner that they deviate the gases escaping from the hottest region from their initial streaming direction against the furnace wall and thus cause the combined effect of cooling said hot gases and cutting off the heat transport by convection.

When solid agents are used they can be thrown in or preferably be injected in the same manner as described for gaseous agents causing a similar effect and in addition thereto also a partial cutting off of heat radiation in that the solid particles floating in the furnace atmosphere absorb such heat and in a minor degree reflect radiated heat back against the melt. The solid agents, however, may also be introduced with the oxygen jet or otherwise be directed against the hottest region of the melt surface so as to form a more or less porous layer on or suspension of solid particles above said surface. Finally it is of course also possible to blow or throw said solid agents against the furnace walls so as partially to form a protective layer on said walls, and particularly on such parts thereof which would otherwise run the risk of becoming superheated.

The invention will now be described more in detail by reference to the accompanying drawing which illustrates a rotary furnace equipped for carrying out the present method.

The rotary furnace 1 comprises a metallic shell having an interior lining 3 and is fitted in a supporting ring 5 having two treads 7. At the rotation of the furnace each tread travels on a set of rollers 9 journalled in bearings 11 secured to the cradle 13 which is mounted in bearings 15 by pivoting shafts 17 so that the whole furnace can be tipped in different positions suitable for charging and tapping as well as for the heat treatment. One of the rollers 9 is driven by a motor 19 over cog wheels 20, 21. Retainer rollers 23 pivoted about pins 24 are provided on the cradle so as to engage treading portions of ring 5 for preventing the furnace from axial dislocation upon tipping. The furnace has a single opening 25 located at the centre of one end wall. An exhaust gas hood 27 is located with a clearance of about 1 decimeter in front of this opening, when the furnace is in position for the heat treatment at an inclination of, for instance, 15–20°. The hood is provided with a cooling jacket 29 having water inlet 30 and outlet 31. Mounted in the hood are two (copper) twyers, one ordinary blast twyer 33 and one twyer 36 for the cooling means. Both are watercooled as indicated by water inlets 34 and 37 and outlets 35 and 38, respectively. Gas rich in oxygen is supplied to the pipe 32 of twyer 33 through the flexible hose 39. The twyer 36 has an inner pipe 40 which is connected to a flexible pipe 41 secured in the outlet pipe 43 of a lime suspending apparatus 45. This apparatus consists of a container having at its top a lime feeding sluice 46 and at its bottom portion a grid 47 and below the grid a pressure gas inlet pipe 49 provided with a valve 50 for the supply of gas for fluidizing the lime supplied to the grid from said sluice. Another pressure gas inlet pipe 51, provided with a valve 52, opens into the container at a suitable level above the grid for supplying feeding gas, if required in addition to that supplied through pipe 49. The furnace can be tapped into a movable ladle 55. The necessary quantity of pressure gas should only amount to a few (less than 10) cubic meters per ton of introduced powder, so that the quantity of gas that leaves the furnace will be increased only a little as a result of the supply by pneumatic means. If it is desired to avoid the introduction of oxygen and nitrogen into the furnace room by this operation it is possible to use other gases than air, e.g. carbon dioxide.

The invention will now be described with reference to its application to an oxidation treatment of pig iron by means of oxygen in a basic-lined furnace of the type illustrated in the drawing but it is evident that the principles of the described process are applicable to all kinds of melting processes in rotary furnaces. As indicated above a considerable heat generation is obtained in the process of refining pig iron by means of oxygen in a rotary furnace by the oxidation of various constituents of the pig iron. Additional heat generation may be obtained by the combustion of the carbon monoxide formed in the process with oxygen to carbon dioxide above the surface of the bath. In order to prevent the temperature of the bath from attaining too high a value it is possible to add a cooling agent. Suitable coolants are lime, which is required also in order to give the resulting slag a desired degree of basicity and scrap iron or iron ore, which latter is reduced and absorbs heat during the process, whereby it has a rather strong cooling effect. The attack on the furnace lining, which normally consists of magnesite or dolomite is considerable in this process, which requires a high temperature. Due to the use of gases rich in oxygen the temperature in the main reaction zone will be remarkably high and by the combustion of generated carbon monoxide in the furnace room above the surface of the bath the gases become very hot.

According to a preferred embodiment of the invention at least part of the necessary lime is blown or thrown in granular or powderous state on to the wall of the furnace in that zone which is most exposed to attacks. In this manner an effective cooling is obtained and at the same time lime, which may have adhered to the wall, protects the wall also from chemical attacks from the resulting slag and insulates it against heat transfer. Thus, the useful life time of the furnace lining may be increased considerably, and, furthermore, the supply of the lime is performed in a manner which is highly convenient for the process. The lime may consist of quick lime or, often with a special advantage, of limestone, which has an additional cooling effect due to its dissociation. Of course, it is possible to add finely ground iron ore which also consumes heat by chemical reaction. The grain size of the cooling agent which is added in this manner should not be too high, but on the other hand the material must not be of such a fine grain size that an appreciable part thereof follows the exhaust gases out from the furnace. The grain size should principally be less than 10 millimeters and preferably less than 5 millimeters, but should on the other hand exceed 0.5 millimeter.

The cooling of the furnace wall may also be performed by means of a gas or gas mixture, preferably carbon dioxide or steam. Assemblies for this purpose are very simple in construction and the cooling may be effective, but in this way a somewhat lower heat economy of the process will be obtained than if the cooling is performed by means of a material which in any case has to be added during the process.

The cooling of the furnace should, of course, in the first hand take place in that zone axially of the furnace where the heat generation is highest and thus the risk of attack on the furnace lining is most serious. Thus, the cooling jet preferably is directed against the top portion of the rotary furnace wall but the jet may also be directed on to the wall at one side nearer the surface of the bath. Where a high excessive temperature arises in the furnace room above the bath it may be convenient to direct the cooling agent on to the wall which rises immediately above the surface of the bath, but the most convenient direction of the jet should, of course, be found out for each special case. It is also possible to direct the cooling agent on to that part of the surface of the bath which has the highest temperature, whereby a considerable reduction of the radiation from the bath and the vicinity thereof is attained.

A certain valuable effect is obtained by the shielding action of the introduced cooling agent while passing through the gas room in the furnace and by spreading the jet of cooling agent an appreciable reduction of the heat radiation on to the furnace wall may be attained.

It has been found that an especially good effect is obtained by means of the present cooling method where the rotational speed of the furnace is rather high exceeding approximately 5 r.p.m.

The quantity of cooling agent which should be added in each case may easily be determined experimentally, but as a rule it is possible to calculate the required quantity with reasonable accuracy. In oxidation treatment of basic Bessemer pig iron of a normal analysis ordinarily a lime addition of the order of say approximately 130–140 kilograms per metric ton of pig iron and about the same quantity of iron ore will be required. Thus, when using a furnace of 2.5 meters inner diameter and having a capacity of 25 tons and when the process is carried out in 35 minutes the average addition of ore and lime amounts to about 200 kilograms per minute. Such a great quantity is not necessary for the cooling of the surface in question but it may, nevertheless, be convenient to add the entire quantity of the necessary additions in this manner, whereby to obtain continuous charging during the process.

If the cooling of the furnace wall is performed by means of steam or carbon dioxide instead of solids the introduction of the gases may be performed by means of the same assembly 45 as for the solids, the supply sluice 46 being stopped. When steam is used for the cooling it is possible to introduce it in the form of liquid water. The quantity of water necessary for obtaining a marked cooling effect in the oxidation treatment of pig iron is rather moderate. About 10 litres per minute appear to give a considerable effect under the above mentioned circumstances. Such a quantity of water does not bring about any economically significant reduction of the heat economy of the process.

The invention is primarily concerned with oxidation treatment of pig iron and particularly processes where the oxidation treatment is performed by means of gases rich in oxygen, but it may advantageously be applied also to other processes of melting metals in a rotary furnace where an effective protection from attacks on the furnace lining is of importance.

What is claimed is:

1. A method of protecting the lining of a rotary furnace when treating a melt of a metal therein by means of a gas rich in oxygen blown from above into contact with the surface of said melt which comprises introducing a stream of cooling agent separately from said gas rich in oxygen into said furnace in such a way as substantially to cut off the radiation of heat from the region of the surface of said melt where said gas rich in oxygen comes into reactive contact with said melt to the furnace wall above said melt, said cooling agent being a granular solid suspended in and carried by a gas and being injected into said furnace so as to impinge against said furnace wall.

2. A method as defined in claim 1 in which the gas component of said cooling agent is a gas selected from the group consisting of steam and carbon dioxide.

3. A method as defined in claim 1 in which the metal is selected from the group consisting of iron, steel and alloys thereof and in which the granular solid component of said cooling agent is a material selected from the group consisting of limestone, quick lime and iron ore.

References Cited in the file of this patent

UNITED STATES PATENTS

| | | |
|---|---|---|
| 730,142 | Mershon | June 2, 1903 |
| 1,968,917 | Soldatoff | Aug. 7, 1934 |
| 2,502,259 | Hulme | Mar. 28, 1950 |
| 2,598,393 | Kalling et al. | May 27, 1952 |
| 2,672,413 | Daubersy | Mar. 16, 1954 |

OTHER REFERENCES

Blast Furnace and Steel Plant; pp. 200–203, February 1957. Paper read at Sao Paulo, Brazil, October 15–28, 1956.